United States Patent [19]

Kimura

[11] 4,312,487
[45] Jan. 26, 1982

[54] PLASTIC DEVICE FOR SUPPORTING PIPES, CORDS AND OTHER ELONGATE OBJECTS

[75] Inventor: Shigeru Kimura, Kamakura, Japan

[73] Assignee: Nifco Inc., Yokohama, Japan

[21] Appl. No.: 172,926

[22] Filed: Jul. 28, 1980

[51] Int. Cl.³ .............................................. F16L 3/08
[52] U.S. Cl. ................................. 248/73; 24/16 PB; 24/339; 248/74 PB; 206/338; 206/805
[58] Field of Search .................... 248/73, 74 B, 74 PB, 248/DIG. 12; 24/16 PB, 17 A, 17 B, 17 AP, 339, 255 BS, 17 R; 206/338, 303, 805; 229/42, 150

[56] References Cited

U.S. PATENT DOCUMENTS

| | | | |
|---|---|---|---|
| 2,994,426 | 8/1961 | Biesecker et al. | 206/150 |
| 3,138,283 | 6/1964 | Peebles | 229/42 X |
| 3,524,538 | 8/1970 | Marlowe | 206/303 |
| 3,758,060 | 9/1973 | Schuplin | 248/74 PB |
| 3,913,187 | 10/1975 | Okuda | 24/255 BS |
| 4,061,299 | 12/1977 | Kurosaki | 248/73 |

Primary Examiner—Ramon S. Britts
Assistant Examiner—R. O. Ramirez
Attorney, Agent, or Firm—J. R. Halvorsen; T. W. Buckman

[57] ABSTRACT

A plastic device for supporting an elongated object comprises a plurality of looped strips of successively greater sizes from the smallest looped strip at the innermost position with the opposite terminals of the looped strips continuously joined into one lateral edge of a common base piece. These looped strips are each provided on the outer side at the central portion thereof with a fastening piece adapted to be brought into engagement with a hook provided on the remaining lateral edge of the base piece. The supporting of an elongated object with this plastic device is accomplished by selecting from among the looped strips the strip of a size befitting the diameter of the elongated object, wrapping it around the elongated object and bringing the fastening piece of the selected strip into engagement with the hook of the base piece.

3 Claims, 5 Drawing Figures

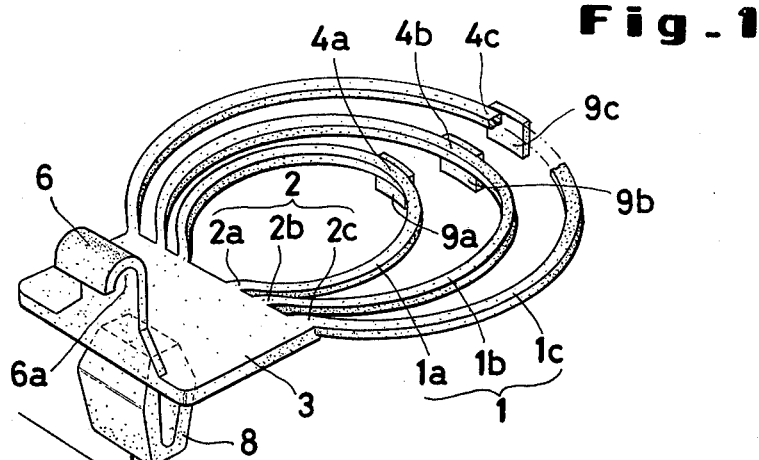
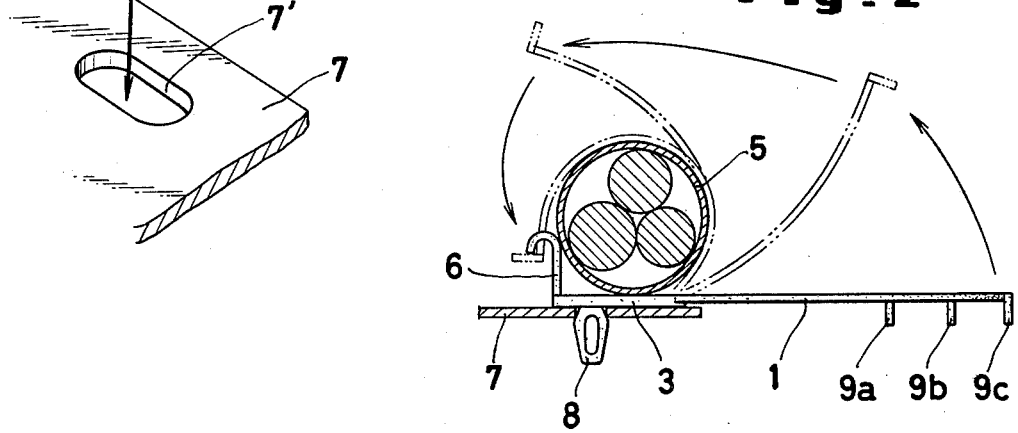
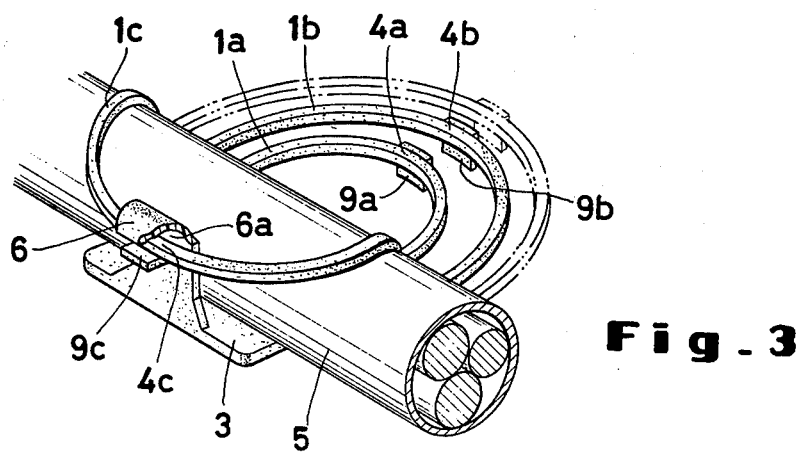

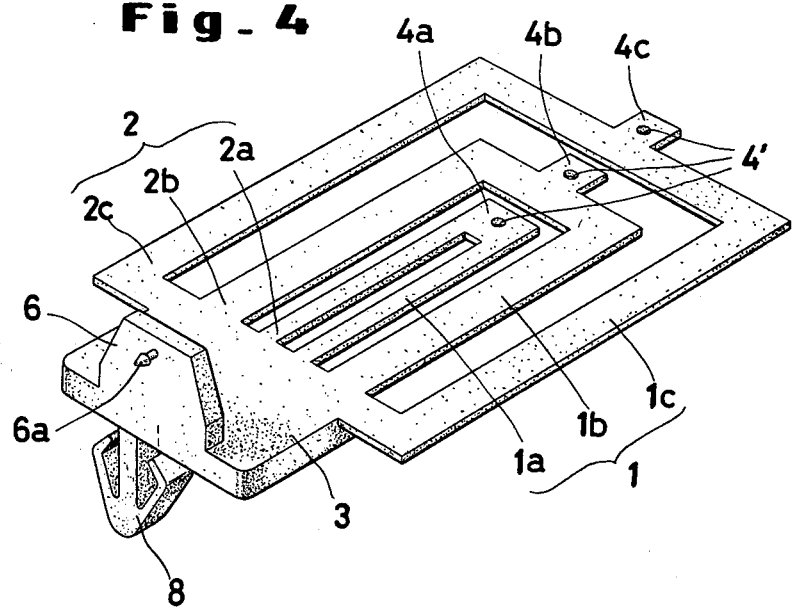
Fig_4
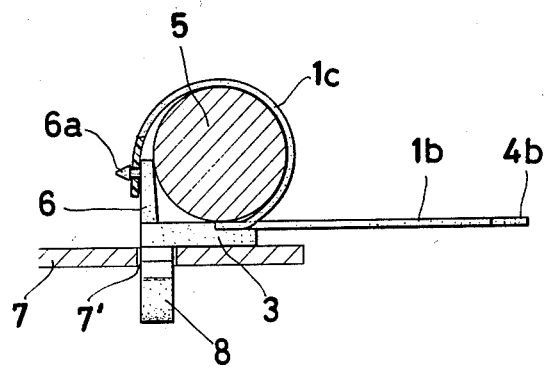
Fig_5

PLASTIC DEVICE FOR SUPPORTING PIPES, CORDS AND OTHER ELONGATE OBJECTS

BACKGROUND OF THE INVENTION

This invention relates to a plastic device for supporting pipes, cords and other elongate objects.

Generally as means for supporting pipes, cords and other elongate objects, there have been proposed numerous devices molded integrally of a plastic material (U.S. Pat. No. 3,913,187, 4,061,299 and 4,131,285, for example). These conventional devices have had a general construction comprising a strip, and an engaging part and an engaged part provided respectively at one end and at the other end of the strip, whereby a pipe, cord or some other elongate object to be supported is secured in position by having the strip wrapped round the elongate object and bringing the engaging part and the engaged part into mutual union. To compensate possible variation in the diameter of elongate objects to be supported, such a conventional device generally incorporates a plurality of engaging parts or engaged parts. Since the plurality of engaging or engaged parts inevitably rely on one strip, the binding force tends to concentrate below the thin strip and consequently cause an unwanted deformation in the corresponding part of the elongate object being supported. To have the elongate object bound powerfully, the strip which is generally formed in a length slightly greater than the wrapping length is wrapped round the object and then is stretched amply to impart desired binding force to the object. The device, therefore, does not necessarily exhibit good workability.

SUMMARY OF THE INVENTION

One object of this invention is to provide a plastic supporting device capable of binding elongate objects of variable diameter with one action.

Another object of this invention is to provide a plastic supporting device capable of stably binding an elongate object.

To accomplish the objects described above according to this invention, there is provided a plastic device for supporting an elongate object, which comprises a plurality of looped strips of successively greater sizes arranged gradually outwardly in the increasing order of their sizes from the smallest looped strip at the innermost position with the opposite terminals of the looped strips continuously joined into one lateral edge of a common base piece, the strips being provided each on the outer sides at the central portions thereof with a fastening piece adapted to be brought into engagement with a hook provided on the remaining lateral edge of the aforementioned base piece.

With this supporting device, desired binding of a given elongate object to a given substrate is accomplished by first applying the elongate object to the portion of the device at which all the looped strips join the base piece, selecting from among the looped strips the strip of a size befitting the diameter of the elongate object and wrapping it round the elongate object and bringing the fastening piece at the farthest point of the looped strip into engagement with the hook on the base piece.

Since the supporting device of this invention offers a wide selection of looped strips of gradually increasing sizes suitable for elongate objects of varying diameters, it permits a given elongate object to be bound most snugly. Further, the supporting device enjoys high stability of the bound elongate object relative to the substrate because the object is bound with the device at two points separated in the axial direction of the object.

The other objects and characteristic features of this invention will become apparent from the further disclosure of invention to be made herein below with reference to the accompanying drawing.

BRIEF EXPLANATION OF THE DRAWING

FIG. 1 is a perspective view of one embodiment of the supporting device according to the present invention.

FIG. 2 is a partially sectioned side view of the supporting device of FIG. 1.

FIG. 3 is a perspective view of the supporting device of FIG. 1 having an elongate object bound therewith.

FIG. 4 is a perspective view of another embodiment of the supporting device according to the present invention.

FIG. 5 is a partially sectioned side view illustrating the supporting device of FIG. 4 having an elongate object bound therewith.

DESCRIPTION OF THE PREFERRED EMBODIMENT

The invention will be described first with respect to the first embodiment illustrated in FIGS. 1 to 3. In this embodiment, the circularly looped strip 1 is composed of three looped strips 1a, 1b, 1c of successively greater diameters and the opposite terminals 2a, 2b, 2c of the looped strips are continuously joined into a common base piece 3. To be specific, the outer side of the first looped strip 1a having the opposite terminals integrally joined to the base piece 3 is surrounded by the second looped strip 1b having a diameter slightly greater than the diameter of the first looped strip 1a, and the outer side of the second looped strip 1b is further surrounded by the third looped strip 1c having a still greater diameter. The three looped strips thus arranged have the appearance of a cross section of a crushed telescope.

At the outermost portions 4a, 4b, 4c of the looped strips which are most distance respectively from the base piece 3, there are provided fastening pieces one each. In the present embodiment, the flat pieces 4a, 4b, 4c formed perpendicularly at the portions indicated above serve as the fastening pieces.

The base piece 3 is provided with a hook 6. In the present embodiment, this hook rises perpendicularly from the base piece 3 of the shape of a plate and terminates in the shape of an outwardly bent hook containing a downwardly open groove 6a adapted to receive into fast engagement the leading end (fastening piece) of each hooked strip.

Now, the method by which the device of this embodiment is used will be described. As illustrated in FIGS. 2-3, an elongate object 5 to be supported is applied to the portion of the device where the looped strips join the base piece, and from among the three looped strips, one particular looped strip as, for example, the looped piece 1c having a size befitting the diameter of the elongate object 5 is picked out and wrapped round the elongate object 5 with the fastening piece 4c brought onto the hooking piece 6 (as indicated by the arrow in FIG. 2). Then, the fastening piece 4c is pulled down forcibly to some extent and inserted into the groove 6a of the hooking piece.

By this simple procedure, the elongate object 5 is bound up. Since the looped strip wrapped around the elongate object retains its looped shape as illustrated in FIG. 3, it produces the same effect as when the elongate object is bound with two strips opposed to each other in the axial direction. The supporting device, therefore, produces its binding force in a dispersed manner. For a given binding force, therefore, the supporting device of this invention causes less deformation on the elongate object than the conventional device using one strip. Moreover, since the elongate object is held fast to the device at two positions separated from each other in the axial direction of the object, this device supports the object with greater stability than the conventional device.

In the present embodiment, a fastener portion 8 of known art is provided on the rear surface of the base piece 3 so that the supporting device itself will be fastened to a substrate 7 such as an automobile body or the chassis of an electric applicance by causing the fastener portion 8 to be secured in a fitting hole 7' bored in advance in the aforementioned substrate 7. This fastener portion 8 may be in the shape of an anchor, canoe, hook, the like well known to the art. Optionally it may be a simple threaded hole.

For the convenience of the work of binding the elongate object as illustrated in FIG. 3 or the work of removing the elongate object from the device, the looped strips are provided at their outermost portions 4a, 4b, 4c with thumb pieces 9a, 9b, 9c. When the looped strip is wrapped round the elongate object or when it is released from the hooking piece, the thumb piece offers a convenient grip for the operator's fingers.

In the case of the illustrated embodiment, the supporting device can be used on elongate objects having diameters falling within three approximate ranges conforming to the successively greater sizes of the three looped strips. The number of these looped strips is at least two. Of the plurality of the looped strips contained in the supporting device, those which are not used may be left as they are or suitably cut off.

The second embodiment illustrated in FIGS. 4 and 5 has the looped strips formed each in a rectangular shape and further has the engaging portions and engaged portions modified to some extent. The components of this device which are identical or similar to those used in the first embodiment described above are denoted by the same numerical symbols. Their description is omitted to avoid repetition.

The looped strips 1a, 1b, 1c are rectangular in shape and their respective opposite terminals are continuously joined to the base piece 3.

The engaged portions on the looped strips' side are mere perforations 4' formed at the outermost portions of the looped strips, and they are adapted so as to be fitted around a wedge-shaped protuberance 6a with a constricted shank extending from the engaging portion 6. The outermost portions of the looped strips concurrently serve as thumb pieces.

The device of the present embodiment is used by the same method as used for the first embodiment. To be specific, desired binding of a given elongate object by this device is accomplished by wrapping the selected looped strip round the elongate object 5 and subsequently fitting the perforation at the outermost portion of the looped strip around the wedgeshaped protuberance 6a on the base piece 3. The removal of the looped strip from the elongate object can easily be accomplished by virtue of the elasticity of the material similarly to the device of the first embodiment.

The device of either of the embodiments described above can easily be mass produced by the molding of a plastic material. When the looped strips are formed of plastic materials of different colors during the molding of the device, the colors facilitate the selection of the looped strips. In the two embodiments described above, the looped strips have been illustrated as possessing a rectangular cross section. It is self-evident that they may be formed in a circular cross section.

In any event, the present invention has an advantage that all that is necessary to bind elongate objects is to select, from a plurality of looped strips, one looped strip having a size befitting the diameter of a given elongate object and then to wrap the selected looped strip around the elongate object. It not merely enjoys high workability but also permits its binding force to be dispersed rationally and stably.

What is claimed is:

1. A supporting device molded integrally of a plastic material and used for binding an elongate object, comprising in combination:
    a base piece,
    an engaging portion provided on said base piece,
    a plurality of looped strips of successively greater sizes having the respective opposite terminals thereof joined integrally into said base piece, said plurality of looped strips being arranged gradually outwardly in the increasing order of their sizes from the smallest looped strip in the innermost position, and
    engaged portions provided one each at the outermost portion of said looped strips and adapted each to come into fast engagement with said engaging portion.

2. The supporting device according to claim 1, wherein said looped strips are provided one each with thumb pieces.

3. The supporting device according to claim 1 or claim 2, wherein said base piece is provided with a fastener portion adapted to be attached to a substrate.

* * * * *